United States Patent [19]

Arroyo et al.

[11] Patent Number: 5,138,685
[45] Date of Patent: Aug. 11, 1992

[54] COMMUNICATIONS CABLE HAVING MICROBIAL RESISTANT WATER BLOCKING PROVISIONS

[75] Inventors: Candido J. Arroyo, Lithonia; Walter J. Paucke, Tucker, both of Ga.

[73] Assignee: AT&T Bell Laboratories, Murray Hill, N.J.

[21] Appl. No.: 709,061

[22] Filed: May 30, 1991

Related U.S. Application Data

[63] Continuation of Ser. No. 468,559, Jan. 23, 1990, abandoned.

[51] Int. Cl.$^5$ .............................. G02B 6/44
[52] U.S. Cl. ...................... 385/113; 385/109; 385/141; 174/118; 174/110 N; 523/173
[58] Field of Search .................... 350/96.23, 96.34; 174/70 R, 70 S, 110 R, 110 N, 113 R, 116, 118; 523/173; 385/100, 109, 112, 113, 114, 141

[56] References Cited

U.S. PATENT DOCUMENTS

| | | | |
|---|---|---|---|
| 4,605,729 | 8/1986 | Barnes et al. | 528/301 |
| 4,810,571 | 3/1989 | Guthrie | 428/286 |
| 4,812,014 | 3/1989 | Sawano et al. | 350/96.23 X |
| 4,820,577 | 4/1989 | Morman et al. | 428/228 |
| 4,867,526 | 9/1989 | Arroyo | 350/96.23 |
| 4,874,219 | 10/1989 | Arroyo et al. | 350/96.23 |

FOREIGN PATENT DOCUMENTS

| | | |
|---|---|---|
| 0351100 | 1/1990 | European Pat. Off. |
| 0361863 | 4/1990 | European Pat. Off. |
| 62-115109 | 5/1987 | Japan |
| 62-231064 | 10/1987 | Japan |

*Primary Examiner*—John D. Lee
*Attorney, Agent, or Firm*—E. W. Somers

[57] ABSTRACT

A communications cable (20) includes water blocking provisions which are microbial resistant. The water blocking provisions include a microbial resistant water blocking member (35) comprising a laminate which includes two tapes (37—37) with a superabsorbent powder (40) therebetween. Advantageously, the superabsorbent powder on contact with moisture swells to block further intrusion of moisture and to prevent its movement longitudinally within the cable. The tapes of the laminate may be non-cellulosic such as for example a spunbonded polyester material which has suitable tensile strength and which has a relatively high porosity and further which prevents the growth of fungus. An adhesive system (42) included in the laminate is sufficient to hold together the tapes and the powder without inhibiting swelling of the powder on contact with water.

10 Claims, 2 Drawing Sheets

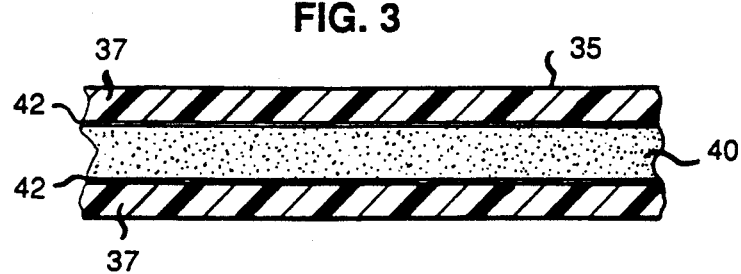
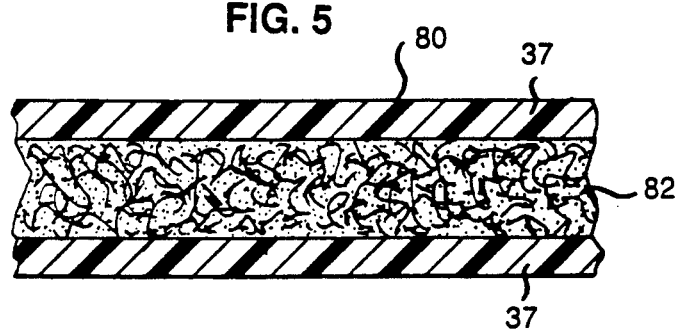
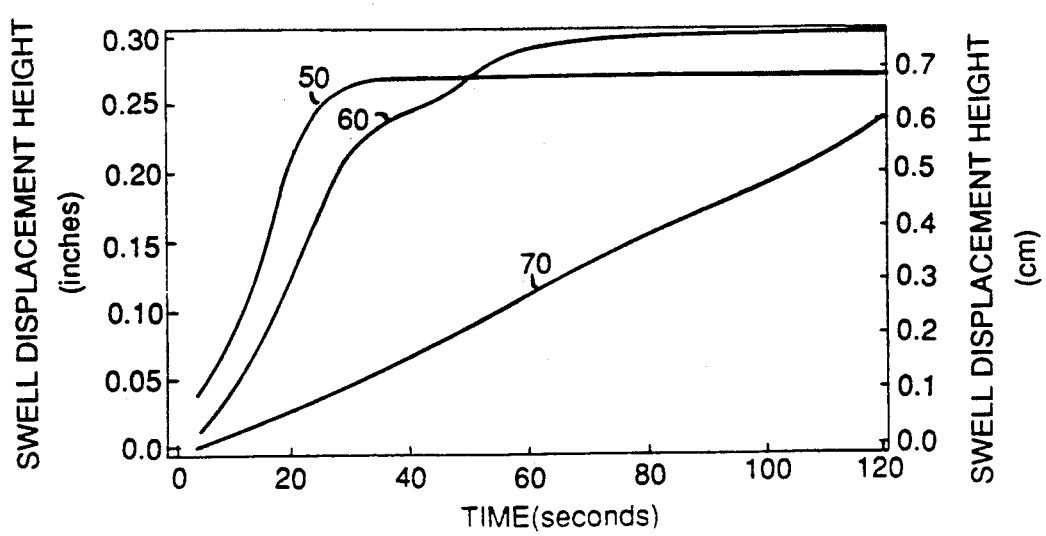

COMMUNICATIONS CABLE HAVING MICROBIAL RESISTANT WATER BLOCKING PROVISIONS

This application is a continuation of application Ser. No. 07/468,559, filed on Jan. 23, 1990 (abandoned).

TECHNICAL FIELD

This invention relates to a communications cable having microbial resistant water blocking provisions. More particularly, it relates to a communications cable which includes antimicrobial facilities which prevent the passageway of water through a sheath system of the cable and the longitudinal migration of water along the interior of the cable.

BACKGROUND OF THE INVENTION

In the cable industry, it is well known that changes in ambient conditions lead to differences in vapor pressure between the inside and the outside of a plastic cable jacket. This generally operates to diffuse moisture in a undirectional manner from the outside of the cable to the inside of the cable. Eventually, this will lead to an undesirably high moisture level inside the cable, especially if a plastic jacket is the only barrier to the ingress of the moisture. High moisture levels inside a cable sheath system may have a detrimental effect on the transmission characteristics of the cable.

Furthermore, water may enter the cable because of damage to the cable which compromises its integrity. For example, lightning or mechanical impacts may cause openings in the sheath system of the cable to occur, allowing water to enter, and, if not controlled, to move longitudinally along the cable into splice closures, for example.

Optical fiber cables have made great inroads into the communications cable market. Although the presence of water itself within an optical fiber cable is not detrimental to its performance, passage of the water along the cable interior to connection points or terminals or associated equipment may cause problems and should be prevented. Further, in some climates, the development of ice within an optical fiber cable may have a crushing influence on the optical fibers in the core which may affect adversely the attenuation thereof.

In the prior art, various techniques have been used to prevent the ingress of water through the sheath system of a cable and into the core. For example, a metallic shield which often times is used to protect a cable against electromagnetic interference is provided with a sealed longitudinal seam. However, becauses lightning strikes may cause holes in the metallic shield, it is not uncommon to include additional provisions for preventing the ingress of water into the core. Filling materials have been and are being used to fill cable cores and to coat portions of cable sheath systems to prevent the movement longitudinally thereof of any water which enters the cable. However, the application of a filling material to a cable core and to sheath components during cable manufacturing presents some housekeeping problems and inhibits somewhat line speeds because of the need to fill carefully interstices of the core.

Presently, many commercially available cables also include a water swellable tape. The tape is used to prevent the travel of water through the sheath system and into the core as well as its travel longitudinally along the cable to closures and termination points, for example. Such a tape generally is laminated, including a water swellable powder which is trapped between two cellulosic tissues. During manufacture of the laminated tape, the powder is exposed to a mist to cause the portions of the laminate to remain together. Further included may be a polyester scrim which is used to provide tensile strength for the laminated tape. Such a tape which provides suitable water protection for the cable must not be too thick. If the tape is too thick, the diameter of the cable is increased, thereby causing problems in terminating the cable with standard size hardware.

A problem which has surfaced as the result of using water blocking tapes relates to microbic growth. The use of tissue-based tapes for water blocking purposes may lead to the growth of fungus. Microbic growth is not desired because it may affect adversely polymeric materials such as by the removal of plasticizers, modifiers and lubricants which result in changes in physical properties and deterioration of electrical properties, for example. Desirably, cables should be free of microbic growth and hence of materials which may engender such growth.

What is needed and what does not appear to be available in the marketplace is a microbial resistant water blocking member, preferably tape-like, which is relatively thin and relatively inexpensive. Such a water blocking member should be one which is compressible and which has acceptable tensile properties. Because in some optical fiber cables, the water blocking member is engaged by helically wound metallic strength members, it should be able to conform to the configurations of those members and to allow those members to become embedded therein without destroying the water blocking effectiveness. If the water blocking member has this capability, commonly used strength member wires will not move about and will provide torsional stability from layer to layer. On the other hand, if the water blocking member does not have this capability and if all the wires were to assume positions on one portion of the periphery, the cable would not be balanced torsionally and would be very difficult to bend.

Care also must be taken to avoid problems caused by what is referred to as bleed-through of molten plastic jacketing material. With a water blocking member comprised of a highly porous substrate, the greater the line speed the greater the flow of the molten plastic material into the substrate and the more difficult it becomes to strip the jacket to expose the core. As a result, the use of a highly porous water blocking member may severely limit the line speed.

What is needed and what seemingly is not available in the prior art is a cable which includes a microbial resistant water blocking member. The sought after member should be one which is relatively low in cost, which is easily incorporated into the cable design and which is easily handled. Also, it should be compressible and should have a suitable porosity.

SUMMARY OF THE INVENTION

The foregoing problems of the prior art have been overcome by the communications cable of this invention. A communications cable comprises a core comprising at least one transmission medium, a jacket which comprises a plastic material and which encloses the core, and a longitudinally extending water blocking laminate which is wrapped about the core between the core and the jacket. The laminate includes two microbial resistant tapes having a superabsorbent water swellable powder disposed therebetween. The powder is swellable upon contact with moisture to block entry of the moisture into said core and movement longitudinally along the cable. Each of the tapes has a thickness that is controlled to optimize the tensile strength of the tape and its porosity.

Also included in the water blocking laminate is an adhesive system. The adhesive system is effective to hold the powder in the laminate and yet not inhibit swelling of the powder upon contact with water.

Each of the tapes of the laminate may be a non-woven spunbonded web-like material which has a relatively high tensile strength and which is relatively thin. As a result, the use of the laminate does not unduly enlarge the cable. Further, each of the tapes has a suitable porosity.

BRIEF DESCRIPTION OF THE DRAWING

Other features of the present invention will be more readily understood from the following detailed description of specific embodiments thereof when read in conjunction with the accompanying drawings, in which:

FIG. 3 is a detail view of a portion of a preferred microbial resistant, water blocking laminate of this invention;

FIG. 4 is a graph which depicts curves which illustrate the water blocking capability of the laminate of the cable of this invention as well as that property of a prior art laminate; and FIG. 5 is a detail view of a portion of an alternate embodiment of a microbial resistant water blocking laminate which may be included in the cable of FIG. 1.

DETAILED DESCRIPTION

Figures 1, 2:
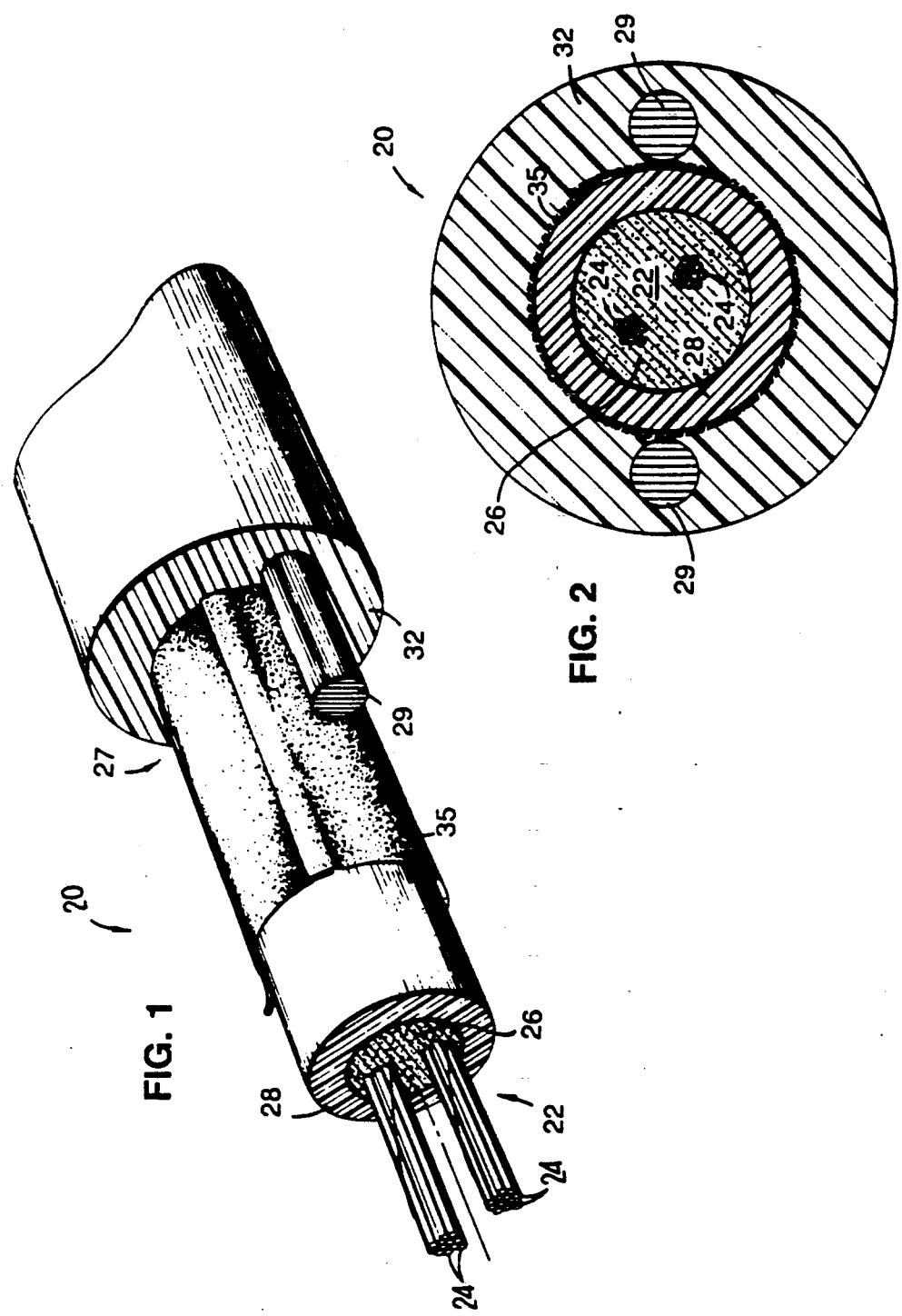
FIG. 1 is a perspective view of a communications cable having a sheath system which includes microbial resistant, water blocking provisions with layers of the sheath system broken away and some of the layers exaggerated in thickness for purposes of clarity.
FIG. 2 is an end sectional view of the cable of FIG. 1.

Referring now to FIGS. 1 and 2, there is shown a communications cable which is designated generally by the numeral 20. It includes a core 22 comprising one or more optical fibers 24—24 and being filled with a material 26 such as that disclosed in U.S. Pat. No. 4,701,016 issued on Oct. 20, 1987 in the names of C. H. Gartside III, et al. The core is enclosed by a sheath system 27 which includes a core tube 28 which encloses the optical fibers, two diametrically opposed strength members 29—29, and an outer jacket 32.

Disposed between the jacket 32 and the core tube 28 is a microbial resistant water blocking member which is designated generally by the numeral 35 (see also FIG. 3). The microbial resistant water blocking member 35 is a laminate comprising a pair of spaced apart microbial resistant substrate or carrier tapes 37—37 each of which is made of a hydrophobic material and between which is sandwiched a water blockable material. A hydrophobic material is one that has no affinity for water. Advantageously, the member 35 is hydrophobic.

In a preferred embodiment, each of the tapes 37—37 is comprised of a non-cellulosic material such as a spunbonded non-woven polyester material and includes a web structure comprised of randomly-arranged fibers which are bonded primarily at the filament crossovers. Continuity of the fibers of the web, while not necessary to the invention, will provide the web with an increased tensile strength. The fibers may be formed of any plastic resin, or other appropriate material, which is substantially nonhygroscopic, and which has the capability of maintaining its shape in the presence of the temperatures encountered during the extrusion of the jacket 32. The fibers of the web structure are arranged so that air cells or pockets are formed.

A polyethylene terephthalate fiber product, formed into a web structure as described above and suitable for use as a substrate tape 37 has been identified under the registered trademark "Reemay" by the E. I. du Pont de Nemours and Company, Incorporated of Wilmington, Del. Presently, the Reemay® web structure is available in various thicknesses and densities from Reemay, Inc. of Old Hickory, Tenn. The properties of Reemay® tapes are further defined and described in Bulletin R-1, dated March, 1986, entitled "Properties and Processing of Reemay® Spunbonded Polyester" from E. I. du Pont de Nemours and Company, Incorporated, Wilminington, Del.

Although in a preferred embodiment, spunbonded polyester tapes are used, others also are acceptable. For example, each of the tapes which are included in the laminated water blocking member 35 may be a nylon spunbonded fabric, non-woven glass, polypropylene melt blown non-woven fabric or, polyurethane spunbonded fabric, for example.

Advantageously, the carrier tape 37 of this invention also acts as a thermal barrier insofar as extrusion temperatures are concerned. As the jacket is extruded over the core, heat is available for transfer into the core. The water blocking member 35 of the cable 20 has the ability to insulate against the heat caused by the extrusion of the jacket.

Another important characteristic of the water blocking member 35 is its stiffness. That stiffness depends in part on the stiffness of each of the tapes 37—37 which depends on the body of the material which comprises the tape. Within limits, as the material of the tape 37 is made increasingly stiffer, it is still relatively easy to form the tape longitudinally about the cable core 22 without wrinkling. However, it is important that the material be supple and flacid enough to conform readily to the contour of the outer surface of the core so that a minimal peripheral dimension is presented over which the plastic jacket is applied. As a desirable consequence, a minimum overall diameter is achieved for the cable which will meet all the necessary requirements.

Stiffness of the material for the tape 37 is controlled by a combination of factors such as the number of fibers per unit volume, thickness of the material, size of the fibers and the amount and type of binder used in the material. Increasing the thickness of the material obviously increases the cost of the material per unit of surface area of cable covered. Increasing the number of the fibers per unit volume or increasing the amount of binder tends to increase the ability of the material to prevent heat transfer during extrusion of the jacket material. Thus, at least four factors, formability of the tape 37, cost of the tape, insulative capability of the tape, and its water blocking capability must be considered and balanced in providing the proper material for use on a particular cable.

In a preferred embodiment, the spunbonded polyester tape 37 combines the thermal, chemical and mechanical properties of polyester fibers with a spunbonded structure to provide a tape which is suitable for use in a communications cable. These properties include a relatively high tensile strength and elongation, excellent tear strength, and resistance to temperatures as high as about 400° F.

In order to render the substrate tape swellable upon contact with moisture, a suitable water swellable material and more specifically a superabsorbent material 40 (see FIG. 3) in powder form is disposed between the spaced apart substrate tapes 37—37. As will be recalled, the water blocking, spunbonded, non-woven tape laminate is designated with the numeral 35.

Superabsorbents are hydrophilic materials which can absorb and retain water under pressure without dissolution in the fluid being absorbed. See J. C. Djock and R. E. Klern "Review of Synthetic and Starch-Graft Copolymer Superabsorbents" prepared for the Absorbent Products Conference held Nov. 16–17, 1983 in San Antonio, Tex. and incorporated by reference hereinto. Properties such as absorbent capacity and rate of uptake are used to characterize a superabsorbent material. One of the early superabsorbents was a saponified starch graft polyacrylonitrile copolymer. See U.S. Pat. No. 3,425,971. The above-identified patent disclosed saponifying starch-graft polyacrylonitrile copolymers with aqueous bases.

The two major superabsorbents which are available today are cellulosic or starch-graft copolymers and synthetic superabsorbents. Of course, in the cables of this invention, the superabsorbent materials which are used are microbial resistant. Accordingly, non-cellulosic superabsorbent materials are used. There are two major broad classes of synthetic superabsorbents. These are the polyelectrolytes and the nonelectrolytes. The polyelectrolytes are the most important and fall into four classes - polyacrylic acid superabsorbents, polymaleic anhydride-vinyl monomer superabsorbents, polyacrylonitrile-based superabsorbents and polyvinyl alcohol superabsorbents. Of these, the polyacrylic acid and polyacrylonitrile-based superabsorbents are most common. As with cellulosic-graft copolymer superabsorbents, the capacity of synthetic superabsorbents decreases with increasing salinity.

The polyacrylic acid class of superabsorbents includes both homopolymers and copolymers of acrylic acids and acrylate esters. The monomer units usually are polymerized to produce a water-soluble polymer which is then rendered insoluble by ionic and/or covalent cross-linking. Cross-linking of the polymer may be accomplished with a multivalent cation, radiation, or with a cross-linking agent. The absorbency of the product is determined by the number of ionizable groups, usually carboxylates, and the cross-linking density.

On contact with water or water-based liquid, the powder 40 yields swollen gel particles. These form an impervious block and prevent further intrusion of the water into or along the cable.

The cross-linking density affects not only the absorbency, but also the time required to absorb and the strength of the gel formed. Generally, the higher the cross-linking density, the stronger is the gel which is formed. The time to reach absorbent capacity decreases as the cross-linking density increases, and the absorbent capacity decreases.

In order to hold the superabsorbent powder 40 between the tapes 37—37, the inwardly facing surface of each substrate tape in a preferred embodiment is coated with a layer 42 of an adhesive material (see again FIG. 3). In the preferred embodiment, the adhesive material is a polypropylene adhesive film one or two sheets of which is inteposed between the powder and each substrate tape 37. As the tapes are laminated under suitable heat and pressure, the adhesive melts in place to retain the superabsorbent powder and adhere together or laminate both spunbonded non-woven tapes.

The carrier tape 37 also possesses specific properties such as porosity and thickness which enhance its use as a water blocking element for a cable, particularly for a communications cable. Of importance is the need for the tape to be made of a material which has a relatively high porosity. It has been found that the water blockability of the water blocking member increases as the porosity of the tapes increase. Porosity may be measured by air permeability in units of cubic feet per minute at a specified water pressure. At 0.5 inch of water pressure, typical porosities are in the range of about 350 to 1000 cfm/min. As a result, entering water contacts a substantial area of the material which is water blocking. There is a surprisingly fast reaction between the water blocking material and the water causing the water blocking material to swell and block off further longitudinal movement of the water along the cable.

The porosity of the untreated tape 37 changes with increasing thickness. In a preferred embodiment, the Reemay ® tape is style 2250 which at 0.5 inch of water has a porosity of 1100 $CFM/ft^2$. Reemay tape marketed under code designation 2250 has a density of 0.5 ounce per square yard, has a thickness of 0.004 inch and is formed of substantially straight polyethylene terephthalate fibers. Reemay tape having a code designation of 2024 has a density of 2.1 ounces per square yard, has a thickness of 0.012 inch, has a porosity of 350 $CFM/ft^2$ at 0.5 inch $H_2O$ and also is formed of substantially straight polyethylene terephthalate fibers. Reemay tape having a code designation of 2415 has a density of 1.15 ounces per square yard, has a thickness of 0.014 inch, has a porosity of 700 $CFM/ft^2$ at 0.5 inch $H_2O$ and is formed of crimped polyethylene terephthalate fibers.

Obviously, various other grades and thicknesses of Reemay spunbonded polyester tape or other similar materials may be used. Material densities of up to about 2 ounces per square yard are practical values. Practical material thickness for each substrate tape may range from 0.004 inch to 0.008 inch thick. Further, the thicknesses and porosities of the two tapes 37—37 of the water blocking member 35 may not be the same. These values by no means limit the invention but represent the presently preferred ranges. The thickness of the water blocking member 35 which includes the two substrate tapes 37—37 and the superabsorbent powder therebetween generally is in the range of about 0.009 to about 0.020 inch.

Although the porosity of each substrate tape 37 is relatively high, that of the laminated water blocking member 35 is relatively low. As a result, if the tape 35 is disposed adjacent to the cable jacket, bleed-through of the molten jacket plastic does not occur.

The porosity of the substrate tape 37 must be balanced against other properties. For example, because the tape is to be embodied in a cable, it is beneficial for the tape to have a relatively high tensile strength. For a given tape width, the tensile strength decreases as the thickness decreases. Although a larger thickness is desired insofar as tensile strength is concerned, a larger thickness may result in less porosity, at least for those tapes which are available commercially. Therefore, these two properties must be balanced against each other to arrive at a final thickness. As mentioned hereinbefore, the style 2250 preferred Reemay ® tape which has a thickness of 0.004 inch is suitable for use in the cables of this invention.

Also if the tapes 37—37 are too porous, the superabsorbent powder may pass through the tapes and not be retained in the laminate. The powders must be trapped between the two spaced apart tapes 37—37. In some prior art applications, it is not uncommon to mist powder held between two tissue tapes to partially activate it and cause it to function as an adhesive. Then the powder is dried immediately after misting to freeze the growth. The powder is thereby formed into a flaked-like consistency which is effective to prevent the powder from passing through the tapes. But if the tapes have a high porosity such as the microbial resistant tapes 37—37 of this invention, misting may not be sufficient to cause the powder to be retained.

As can be seen, the porosity of the tape is important. It must be sufficiently high to allow the water to pass through but yet be suitable in cooperation with the adhesive system to retain the powder. In the preferred embodiment, the porosity is about 1100 cfm/ft$^2$. Although in the preferred embodiment, each tape 37 has the same porosity, it is also possible to use two substrate tapes 37—37, one having a porosity which is greater than the other.

Thickness of the tape 37 also is important from another standpoint. In order to allow the cable to be terminated by standard size hardware, the diameter of the cable must be maintained within a desired range. Accordingly, the thickness of each element of the sheath system must be considered. Therefore, the thickness is established while being mindful of the porosity and the tensile strength. The tape 37 must not be too thin, else the tensile strength is affected adversely, and if too thick, the porosity and overall cable outside diameter are affected adversely.

Viewing now the curves in FIG. 4, there are seen plots of swell displacement height in inches versus time in seconds for three water blocking members. A plot designated by the numeral 50 represents a water blocking member which comprises a laminate including a superabsorbent powder trapped between two tapes but which does not include microbial resistant materials. Curves designated 60 and 70 illustrates the swell behavior of water blocking members 35—35 of this invention. The curves of the test represent laminates exposed to distilled water which is a standard used in quality control tests of such laminates.

In order to move the curve 70 of the laminate of this invention to the left and increase the rate of rise to that such as in the curve 50, any one or more of three approaches can be taken. First, the loading of superabsorbent powder 40 between the two substrate tapes 37—37 can be increased. Secondly, the adhesion between the two tapes can be reduced so as not to inhibit the swellability of the laminate. Lastly, the superabsorbent powder 40 can be one which responds more quickly to contact with water. This last route is the most expensive. In the water blocking member represented by the curve 60, the adhesion between the substrate tapes 37—37 is less than that of the water blocking member represented by the curve 70.

As can be seen in FIG. 4, the water blocking member represented by the curve 50 has a somewhat faster response than that of the water blocking member 35 represented by the curve 60. This occurs because the tissue substrate material of the former swells upon contact with water. For the water blocking member 35 of this invention, the substrate tapes do not swell; rather, swelling occurs after the water has passed through the tapes and contacted the superabsorbent material. As a result, there is a slight delay before swelling begins to occur in the water blocking member of this invention.

The resistance of synthetic polymeric materials to fungus may be determined in accordance with test procedures set forth in ASTM Designation G 21-70. Water blocking members of this invention under evaluation were subjected to a twenty-one day test, which required visual evaluation of test specimens for signs of fungus growth at 7, 14 and 21 days of incubation. Each sample was inoculated with a composite spore suspension of fungi prior to their incubation in a controlled environment. At the time intervals specified, the samples were examined for fungus growth with the amount of fungus rated from 0 to 4 with 0 representing no fungus growth and 4 characteristic of the heaviest growth. In order that water blocking materials be characterized as non-nutritive to fungus, the water blocking material must be such that it does not support any fungus growth. The samples represented by the curves 60 and 70 received a 0 rating at each evaluation period indicating no fungus growth detected at any time during the test.

Another embodiment of the water blocking member 35 is depicted in FIG. 5. As shown, a water blocking member 80 includes two spaced apart tapes 37—37 with a material 82 disposed therebetween. The material 82 comprises a mixture of a superabsorbent powder and an adhesive material such as a hot melt, water based adhesive material.

It is to be understood that the above-described arrangements are simply illustrative of the invention. Other arrangements may be devised by those skilled in the art which will embody the principles of the invention and fall within the spirit and scope thereof.

We claim:

1. A communications cable, which comprises:
   a core comprising at least one transmission medium;
   a jacket which comprises a plastic material and which encloses said core; and
   a longitudinally extending laminate which is disposed about said core between said core and said jacket, said laminate comprising:
   two microbial resistant non-cellulosic substrate tapes each having a thickness that is controlled to optimize the tensile strength of said tape and its porosity which is relative high;
   a microbial resistant superabsorbent material being disposed between said tapes and being swellable upon contact with water to block entry of the water into and movement longitudinally along the core; and
   an adhesive system which is sufficient to hold together said tapes and to prevent said superabsorbent material from moving through said tapes without inhibiting the swelling of said superabsorbent material upon contact with water.

2. The cable of claim 1, wherein said superabsorbent material comprises a superabsorbent powder.

3. The cable of claim 2, wherein said superabsorbent powder is a powder selected from the group consisting of:
   a. a polyacrylic acid based material;
   b. a polyacrylamide based material;
   c. blends of (a) and (b);

d. salts of (a) and (b); and e. copolymers of (a) and (b).

4. The cable of claim 2, wherein each said tape has a thickness which does not exceed about 0.010 inch and a tensile strength which is at least about 5 lbs/inch of width.

5. The cable of claim 2, wherein each said tape prior to lamination thereof has a porosity in the range of about 1100 cfm at 0.5 inch of water.

6. The cable of claim 2, wherein interposed between an inwardly facing surface of each said substrate tape and said superabsorbent material is an adhesive material.

7. The cable of claim 6, wherein said adhesive material is a polypropylene adhesive material.

8. The cable of claim 2, wherein each said tape comprises a tape made of a non-cellulosic material.

9. The cable of claim 2, wherein a mixture comprising said superabsorbent material and said adhesive system is disposed between said tapes.

10. The cable of claim 9, wherein said adhesive system comprises a hot melt adhesive material.

* * * * *